United States Patent
Bowser

(10) Patent No.: US 7,274,460 B2
(45) Date of Patent: Sep. 25, 2007

(54) STIMULATED RATE OPTICAL POWER MEASUREMENT IN A FIBER OPTIC GYROSCOPE

(75) Inventor: Mark P. Bowser, Dover, MA (US)

(73) Assignee: Northrop Grumman Corporation, Los Angeles, CA (US)

(*) Notice: Subject to any disclaimer, the term of this patent is extended or adjusted under 35 U.S.C. 154(b) by 224 days.

(21) Appl. No.: 10/859,822

(22) Filed: Jun. 2, 2004

(65) Prior Publication Data

US 2005/0270540 A1 Dec. 8, 2005

(51) Int. Cl.
G01C 19/72 (2006.01)

(52) U.S. Cl. .................................................. 356/460

(58) Field of Classification Search ............. 356/460, 356/462, 463, 464; 250/227.19, 227.27; 385/12
See application file for complete search history.

(56) References Cited

U.S. PATENT DOCUMENTS

| | | | |
|---|---|---|---|
| 4,299,490 A | 11/1981 | Cahill et al. | |
| 4,372,685 A | 2/1983 | Ulrich | |
| 4,545,682 A | 10/1985 | Greenwood | |
| 5,009,480 A | 4/1991 | Okada et al. | |
| 5,108,181 A | * 4/1992 | Nakagami | .................. 356/464 |
| 6,028,668 A | 2/2000 | Rider | |
| 6,377,351 B1 | 4/2002 | Kim et al. | |

* cited by examiner

Primary Examiner—Michael A. Lyons

(57) ABSTRACT

Fiber optic gyroscopes having integrated power measurement capabilities and related methods and apparatus. More particularly, fiber optic gyroscopes having an integrated method for determining the optical power by applying an electronic stimulated rate internal to the closed loop digital electronics of the gyroscopes and monitoring the counts out per second (COPS) using each gyroscope's counts output signal. Knowing a COPS value, the optical power can be determined by dividing a constant K by the COPS value, i.e. Optical Power=K/COPS. The value of K is specific to each gyroscope, and can be calculated or measured.

13 Claims, 2 Drawing Sheets

STIMULATED RATE OPTICAL POWER MEASUREMENT IN A FIBER OPTIC GYROSCOPE

STATEMENT REGARDING FEDERALLY SPONSORED RESEARCH

The U.S. Government has a paid-up license in this invention and the right in limited circumstances to require the patent owner to license others on reasonable terms.

FIELD OF THE INVENTION

The present invention relates generally to optical gyroscopes, and more particularly to interferometer fiber optic gyroscopes.

BACKGROUND OF THE INVENTION

An optical gyroscope measures the interference pattern generated by two light beams, traveling in opposite directions within a mirrored ring (laser or "ring laser" gyroscopes) or fiber loop (fiber optic gyroscopes), in order to detect very small changes in motion. Optical gyroscopes are based on a principle called the "Sagnac effect" discovered at the beginning of the 20th century. Optical gyroscopes have a variety of applications, but are particularly well suited for use in guidance, navigation, and control systems such as those of aircrafts and spacecrafts. An example of an optical gyroscope can be found in U.S. Pat. No. 4,545,682, incorporated herein by reference in its entirety.

There are several different types of fiber optic gyroscopes including at least interferometer fiber optic gyroscopes (IFOGs) and resonator fiber optic gyroscopes (RFOGs). IFOGs are phase sensitive devices with the Sagnac effect generating an optical phase difference between two counterpropagating waves in a rotating fiber coil. RFOGs are frequency sensitive devices with the Sagnac effect generating a frequency difference between two resonant beams in a ring fiber cavity locked to resonant clockwise and counterclockwise frequencies.

IFOGs typically operate in either an open loop or a closed loop configuration. In the closed loop configuration, a phase shift equal in magnitude but opposite in sign to the phase shift generated by the Sagnac effect is generated, and the frequency of the generated phase shift is then determined from the apparatus generating it.

In many instances a FOG will comprise a optical receiver or other mechanism for converting the light output (which is a combination of the two counterpropagating beams) by a coil assembly to an analog signal. As the term is used herein, the "optical power" of the gyroscope is a measurement of the power of the light being output by the coil assembly and fed into the optical receiver.

SUMMARY OF THE INVENTION

The present invention is directed to fiber optic gyroscopes having integrated power measurement capabilities, and to related methods and apparatus. More particularly, the present invention is directed to determining the optical power of a fiber optic gyroscope (FOG) by applying an electronic stimulated rate internal to the closed loop digital electronics of the gyroscope and monitoring the counts out per second (COPS) using the gyroscope's counts output signal. Knowing a COPS value, the optical power can be determined by dividing a constant K by the COPS value, i.e. Optical Power=K/COPS. The value of K is specific to the gyroscope, and can be calculated or measured. Different gyroscopes will implement such a method of determining optical power in varying degrees with some actually transmitting a power value computed in such a manner, and others simply providing a mechanism for stimulating a rate.

The present invention may be characterized as a method for calculating the optical power of a fiber optic gyroscope that outputs a value proportional to an angular velocity of the gyroscope, the method comprising multiplying the output value by a constant K. In some instances K may be calculated from known characteristics of the gyroscope while in others it may be based at least in part on prior actual measurement of optical power. It is contemplated that in some instances the value of K will vary in relation to angular velocity, and calculating the optical power will comprise determining the value of K for a selected angular velocity, subsequently providing a rate input to the gyroscope that causes it to react as if it were being rotated at the selected angular velocity, and using the gyroscope output value resulting from providing the rate input to calculate the optical power of the gyroscope.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

As previously mentioned, the term "optical power" in relation to an optical gyroscope is used herein to refer the power of the light being output by a coil assembly and fed into the optical receiver. Although the optical power can be measured directly, doing so requires that one have access to the optical receiver inputs. Unfortunately, is not always possible or desirable to have such access.

It has been found that the optical power, at least for interferometer fiber optic gyroscopes, is inversely proportional to the counts output of the gyroscope when a stimulated electronic rate is applied, and thus the angular velocity of the gyroscope. As such, an optical power value can be computed by dividing a constant K by the counts output of the gyroscope, i.e. Optical Power=K/Counts.

It is contemplated that the use of such a method would be facilitated by providing a gyroscope with a mechanism for simulating an angular velocity such that a rate value could be provided to the gyroscope to cause it to generate a non-zero counts output even if the gyroscope was physically not rotating, and to utilize the counts output to calculate an optical power value by computing K/Counts. Providing such an angular velocity or other rate to the gyroscope is sometimes referred to herein as stimulating an angular velocity and sometimes as stimulating a rate.

Figure 1:
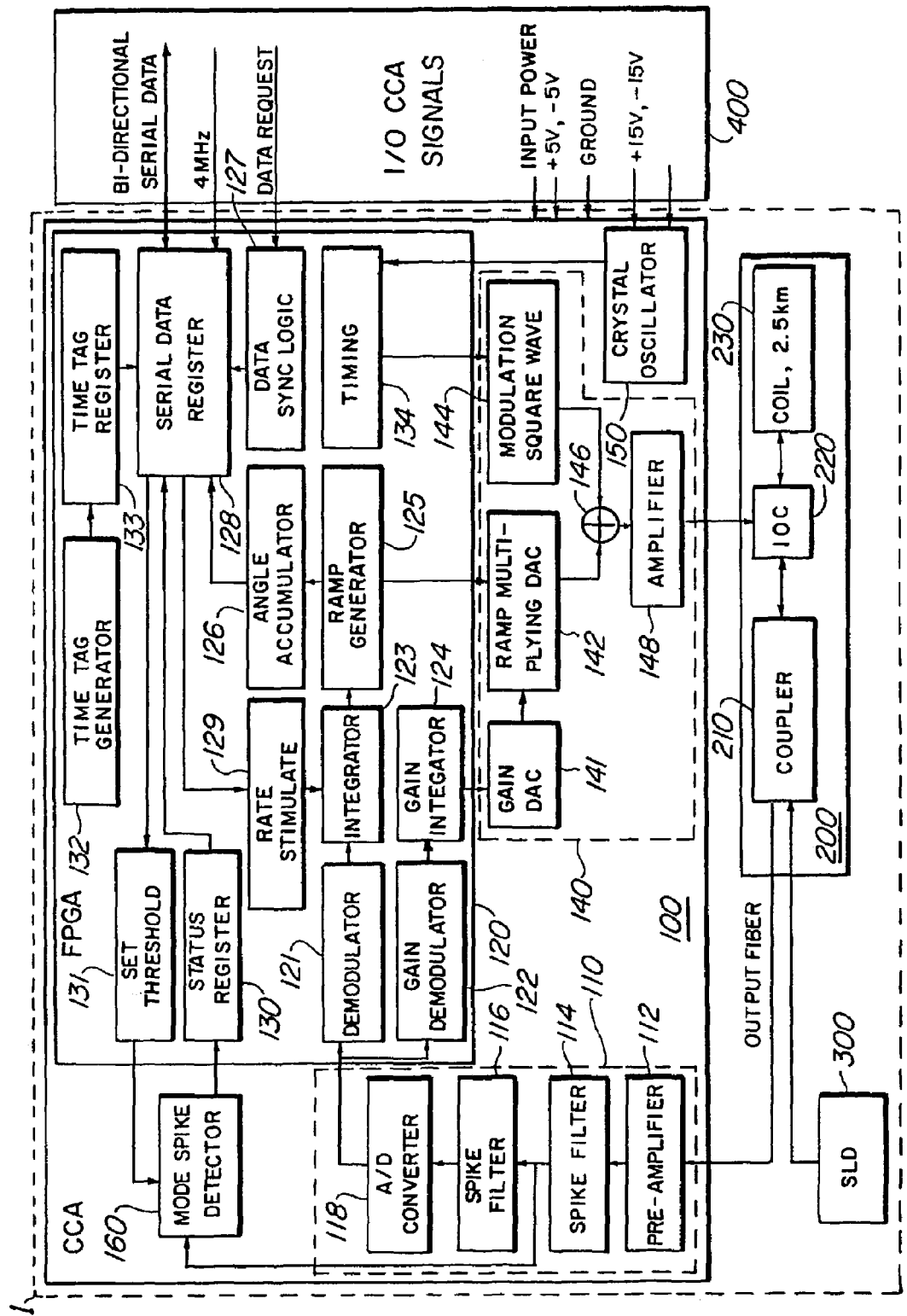
FIG. 1 is a block diagram illustrating the functional components of an interferometer fiber optic gyroscope according to the present invention.

Referring to FIG. 1, a preferred fiber optic gyroscope (FOG) 1 has been provided with such a mechanism. The FOG of FIG. 1 comprises a controller assembly 100 and a coil assembly 200. The controller assembly 100 comprises an optical to digital converter module 110, a field programmable gate array (FPGA) 120, output modulator module 140, an oscillator 150, and a modulation spike detector 160. The coil assembly 200 comprises a coupler assembly 210, an integrated optical chip (IOC) 220, and a fiber optic coil 230.

The optical to digital converter module 110 comprises an optical receiver 112, a pre-amplifier 114, a spike filter 116 and an analog to digital (A/D) converter 118. The optical receiver is a photodiode or other apparatus that converts the light of the combined beam output from the coil assembly to an electrical signal. The pre-amplifier is used to adjust the amplitude of the signal produced, and the spike filter is a band pass filter use to filter out extremely high frequencies such as those caused by spikes, as well as low frequencies. The output of the pre-amplifier 114 is also provided as an input to the modulation spike detector 150. The pre-amplifier and spike filter are used to shape the signal output by the optical receiver to a signal form suitable to serve as an input to the A/D converter 118. The A/D converter 118 converts the amplified and filtered analog signal from the optical receiver into a digital signal to be fed into the FPGA where it is digitally demodulated at the modulation (proper) frequency.

FPGA 120 is programmed to implement a significant portion of the functionality of controller 100 including demodulation of the signal provided by the optical to digital converter module 110, determining and outputting a counts value, and generating the modulation and phase ramp signal to be applied to the IOC used to adjust the phase or some other characteristic of the counter propagating beams in the coil. As such, demodulator 121 locks in at fundamental frequency and outputs a DC value proportional to the phase shift. The integrator 123 integrates the DC value from the demodulator 121 and a stimulated rate input 129 over time and feeds that output to a ramp generator 125. Outputs from ramp generator 125 are transmitted to modulation module 140, and angle accumulator 126 which is electrically coupled to serial data register 128. FPGA 120 also preferably includes gain demodulator 122, gain integrator 124, status register 130, set threshold 131, timing circuit 134, data sync logic circuit 127, time tag generator 132, and time tag register 133.

Module 140 comprises a gain DAC 141, ramp multiplying DAC 142, modulation square wave generator 144, summer 146, and amplifier 148.

The coil assembly 200 has as inputs light from a super luminescent diode (SLD) 300 and the modulation and phase ramp voltage from the FOG electronics controller module 100. The coupler assembly 210 comprises one or more couplers and is adapted to split light from the SLD 300 into two beams and to feed those beams into the IOC 220, and to combine the two beams after they pass through the coil 230 and to feed the combined beams out of the coil assembly 200 to the controller assembly 100. The integrated optical chip (IOC) performs the function of phase shifting both of the beams in opposite directions as they pass through the IOC to nullify the phase difference between the two beams in response to the output from FOG controller.

Interface array 400 comprises a majority of the inputs and outputs to controller 100.

Of particular interest in the FOG of FIG. 1 is the rate stimulator 129 which, in cooperation with the serial data register 128 and integrator 123, permit an external rate to be input into the gyroscope and added to any rate actually detected by the gyroscope. As such, even when the gyroscope is stationary, it can be caused to react as if it were being rotated at the rate being input (or at a rate related to the input value) via the rate stimulator. This allows gyroscope movement to be simulated without requiring movement of the gyroscope. Simulating movement of the gyroscope comprises providing a rate value to the gyroscope that causes the gyroscope to output an angular velocity value equivalent to the value it would output if the gyroscope were physically rotating at the provided rate.

It is important to note that the provided rate value need not actually be a specific angular velocity value that is to be simulated. Instead the value may be proportional to the rate to be specified, may be related to a phase difference or other factor internally related to rate value, or may be related to the rate to be simulated in some other manner. In some instances, it may simply be an identifier associated with a stored rate value accessible to the gyroscope. As such, the phrase "providing a rate value" and similar phrases used herein should be interpreted broadly, and not be limited to "providing an angular velocity value".

Figure 2:
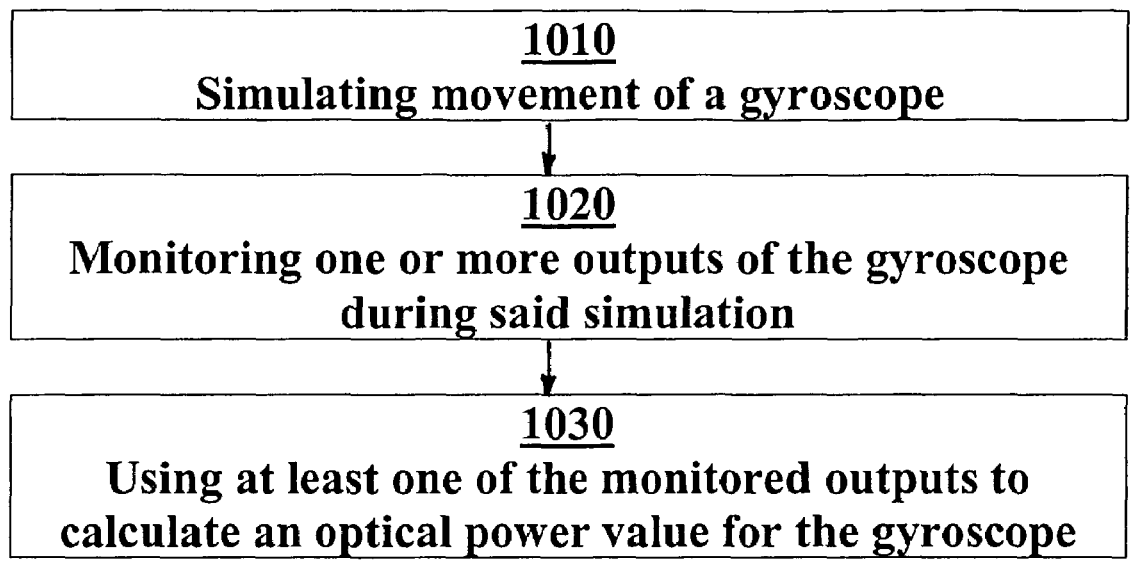
FIG. 2 is block diagram illustrating a preferred method of calculating the optical power of a gyroscope according to the present invention.

The FOG of FIG. 1 is particularly well suited for use in the method illustrated in FIG. 2. Referring to FIG. 2, a preferred method of calculating the optical power of a fiber optic gyroscope comprises: step 2010, simulating movement of a gyroscope; step 2020, monitoring one or more outputs of the gyroscope during said simulation; and step 2030, using at least one of the monitored outputs to calculate an optical power value for the gyroscope.

As the method of FIG. 2 illustrates, the concept of measuring optical power of a gyroscope by simulating movement of the gyroscope has general applicability. Although particularly well suited for IFOGs, it is not limited to a particular type of gyroscope, to a particular method for calculating power, or to a particular method for simulating movement. As such, it may be applicable to any type of gyroscope wherein it makes sense to measure an optical power, and the optical power can be determined by monitoring one or more outputs of the gyroscope. Similarly, any method for calculating power, at least in part from one or more monitored outputs, may be used. Although the preferred method is to use the formula Optical Power=K/COPS, in some instances other formulas may be used. Also, the method of simulating movement may in some instances not be accomplished by creating an apparent a phase difference between two counter propagating beams, such as is done in the FOG of FIG. 1 by integrating a rate input with a demodulator output as illustrated in regard to the IFOG of FIG. 1.

Figure 3:
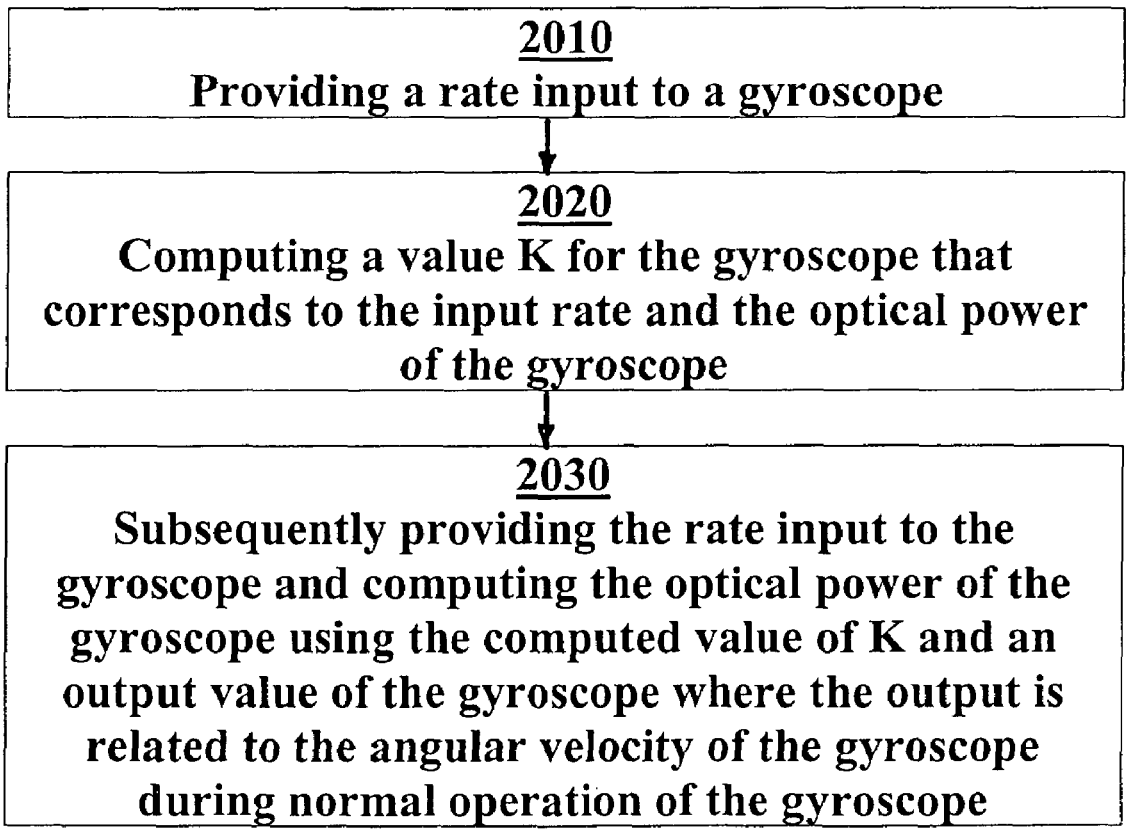
FIG. 3 is bock diagram illustrating a preferred method of calculating the optical power of a gyroscope according to the present invention.

FIG. 3, illustrates a more specific instance of the method of FIG. 2 for which the FOG of FIG. 1 is particularly well suited. Referring to FIG. 3, another preferred method of calculating the optical power of a fiber optic gyroscope comprises: step 3010, providing a rate input to a gyroscope; step 3020, computing a value K for the gyroscope that corresponds to the input rate and the optical power of the gyroscope; and step 3030, subsequently providing the rate input to the gyroscope and computing the optical power of the gyroscope using the computed value of K and an output value of the gyroscope where the output is related to the angular velocity of the gyroscope during normal operation of the gyroscope. It is contemplated that some implementations may use a K that is constant for all or at least a range of simulated rates wherein others will use a K with a value that is a function of the stimulated rate, and still others may use a K with a value that varies in relation to one or more other factors: e.g. pre-amp gain.

As should be apparent, once the value of K is determined, the formula K/COPS can be used to calculate power even if actual measurement of power is not possible, is likely to introduce errors, or is less desirable for any reason. Once K is known, all that is needed to compute optical power is one or more COPS values.

It is contemplated that K may be determined by calculating its value from a plurality of factors that include one or more of the following: modulation amplitude, optical receiver transimpedance, preamplifier gains, filter gains, A/D converter least significant bit, and the size of the stimulated rate bit. In other instances, the value of K may be determined by obtaining an optical power value and a corresponding counts output per second value and using the ratio of the optical power value to the counts output per second value as K. It is contemplated that in some instances other methods of calculating K may be used. Alternatively power ratios may be used such that K need not be determined at all such as if the ratio of the current optical power relative to a reference optical power is computed by dividing a reference counts value by the current counts value.

It is contemplated that the apparatus and methods disclosed herein can be used to facilitate measurement of the optical power at each stage of the manufacture process of a three axis cluster gyro system. During the manufacture process the fibers coming out of the three axis cluster are routed and permanently positioned relative to an optical source and optical receiver. As each fiber is routed around a corner it is crucial to minimize optical power attenuation, and being able to quickly and easily measure optical power greatly simplifies the manufacturing process. Calculating the Stimulated Rate Optical Power (SROP) is also non-invasive, ie the fibers don't have to be moved to make the optical power measurement.

It is also contemplated that the use of the SROP method disclosed herein provided numerous other benefits. As an example, over a period of time(eg months) the mechanical alignments of the fibers at the coupling points in a FOG system can shift, thus changing the optical power. Using SROP simplifies the determination of the trend. As another example, over a temperature profile the mechanical alignments of the fiber couplings and the inherent losses of the fibers in the coil can change causing a change in the Optical Power. Using SROP measurement provides a quick easy method to monitor these phenomena. Yet another examples applies to FOGs on satellites. For FOGs on satellites, the fiber undergoes a well known radiation fiber darkening process due to an ionization process in the fiber. In addition the SLD Optical Source decays over a period of years. The SROP measurement provides a quick easy way to monitor this process. It is also contemplated that the process of characterization of the FOG Angle Random Walk (ARW) as a function of Optical Source SLD Current is made quicker and easier using SROP.

Optical gyroscopes may vary in the degree to which they incorporate the methods disclosed herein. As such, some gyroscopes may simply provide a mechanism for simulating movement wherein others actually retain (and possibly determine) one or more K values and provide an optical power output such that the power can be read directly rather than being computed. Such a power output may be made via a dedicated port or line, or may be provided upon receipt of an external request. In other instances, one or more reference power values and/or reference counts value may be stored for use in subsequent power calculations.

In some instances, a particular gyroscope may provide functionality that facilitates calibration. If such a gyroscope stores internal values for subsequent calculations, the functionality provided may comprise a mechanism for replacing such values with externally provided values, or with internally determined values. In some instances a particular gyroscope may store a plurality of rate values, phase differences, or something similar such that an external request for an optical power value need not necessarily provide such values. Each of such plurality of rate values may also have a K value, optical power value, or counts value associated with it. It is contemplated that in some instances, optical power may be computed as a statistical value related to the optical power determined for various stimulated rates.

In conclusion, the present invention may be characterized as a method for calculating the optical power of a fiber optic gyroscope that outputs a value proportional to an angular velocity of the gyroscope, the method comprising multiplying or dividing the output value by a constant. In some instances the constant may be calculated from known characteristics of the gyroscope while in others it may be based at least in part on prior actual measurement of optical power. It is contemplated that in some instances the value of K will vary in relation to angular velocity, and calculating the optical power will comprise determining the value of K for a selected angular velocity, subsequently providing a rate input to the gyroscope that causes it to react as if a it were being rotated at the selected angular velocity, and using the gyroscope output value resulting from providing the rate input to calculate the optical power of the gyroscope.

The present invention may also be characterized as a method of calculating the optical power of a fiber optic gyroscope comprising: determining a counts output per second value for the gyroscope; determining the optical power of the gyroscope, at least in part, from the counts output per second value. In some instances, such a method may also comprise determining a value K for the gyroscope, and determining the optical power of the gyroscope, at least in part, from both K and the counts output per second value. In some such instances, determining the optical power of the gyroscope comprises determining the value of K divided by the counts output per second value. In some such instances, determining the value of K comprises calculating the value from a plurality of factors that include one or more of the following: modulation amplitude, optical receiver transimpedance, preamplifier gains, filter gains, A/D converter least significant bit, and the size of the stimulated rate bit. In other instances, determining the value of K comprises obtaining an optical power value and a corresponding counts output per second value and using the ratio of the optical power value to the counts output per second value as K.

The present invention may also be characterized as an optical gyroscope comprising a mechanism for modifying a value determined internally in the gyroscope. In some instances one or more of the following may also be applicable: the value is related to an angular velocity of the gyroscope; the value is a phase difference between two counterpropogating light beams; modifying a value comprises adding a rate value to the phase difference to produced a resultant sum; the resultant sum causes the gyroscope to adjust the phase difference between the two counterpropogating light beams; the rate value is added to a demodulator output value, and the resultant sum is provided as an input to a ramp generator; the gyroscope is a closed loop interferometer fiber optic gyroscope.

It is also possible to characterize the present invention as a closed loop interferometer fiber optic gyroscope comprising a mechanism for specifying a rate such that a specified rate causes the gyroscope, while stationary, to produce the same counts output that it would generate if it were physically rotating at the specified rate. In some instances the gyroscope is adapted to provide an output value equal to the optical power of the gyroscope in response to an external request, to internally specify the rate and use the resultant counts value to compute the optical power output value. In some such instances the gyroscope comprises a mechanism for storing a rate and a constant value to be used in response to an external request for the optical power value.

What is claimed is:

1. A method of determining performance, or life expectancy of a fiber optic gyroscope comprising:
   simulating movement of the gyroscope;
   monitoring an output of the gyroscope during said simulation;
   using the monitored output to calculate an optical power value for the gyroscope; and
   determining life expectancy of the gyroscope using the calculated optical power value.

2. The method of claim 1 wherein the monitored output is a value proportional to an angular velocity of the gyroscope.

3. The method of claim 2 wherein simulating movement of the gyroscope comprises providing a rate value to the gyroscope that causes the gyroscope to output an angular velocity value equivalent to the value it would output if the gyroscope were physically rotating at the provided rate.

4. The method of claim 3 wherein the provided rate value is added to a value corresponding to a phase difference between two counterpropagating light beams.

5. The method of claim 4 wherein using the monitored output to calculate an optical power value comprises dividing a predetermined constant by the value of the monitored output.

6. The method of claim 1 comprising:
   determining a counts output per second value for the gyroscope; and
   determining the optical power of the gyroscope, at least in part, from the counts output per second value.

7. The method of claim 6 further comprising determining a value K for the gyroscope, and determining the optical power of the gyroscope, at least in part, from both K and the counts output per second value.

8. The method of claim 7 wherein determining the optical power of the gyroscope comprises determining the value of K divided by the counts output per second 9value.

9. The method of claim 8 wherein determining the value of K comprises calculating the value from a plurality of factors that include one or more of the following: modulation amplitude, optical receiver transimpedance, preamplifier gains, filter gains, A/D converter least significant bit, and the size of the stimulated rate bit.

10. The method of claim 8 wherein determining the value of K comprises obtaining an optical power value and a corresponding counts output per second value and using the ratio of the optical power value to the counts output per second value as K.

11. A closed loop interferometer fiber optic gyroscope comprising:
    a synchronous detector;
    an integrator; and
    means for introducing a simulated rate diagnostic signal in between the synchronous detector and the integrator, creating a DC steady state disturbance in the closed loop, as if an input angular rate had been applied to the fiber optic gyroscope.

12. The gyroscope of claim 11 further comprising:
    means to provide an output value equal to the optical power of the gyroscope in response to an external request, by internally specifying the rate and using the resultant counts value to compute the optical power output value.

13. The gyroscope of claim 12 further comprising means for storing a rate and a constant value to be used in response to an external request for the optical power value.

* * * * *